US010284591B2

(12) United States Patent
Giuliani et al.

(10) Patent No.: US 10,284,591 B2
(45) Date of Patent: May 7, 2019

(54) DETECTING AND PREVENTING EXECUTION OF SOFTWARE EXPLOITS

(71) Applicant: Webroot Inc., Broomfield, CO (US)

(72) Inventors: Marco Giuliani, Bastia Umbra (IT); Marco Bizzarri, Sassoferrato (IT); Benedetto Voltattorni, San Benedetto del Tronto (IT); Johannes Mayr, Linz (AT)

(73) Assignee: WEBROOT INC., Broomfield, CO (US)

(*) Notice: Subject to any disclaimer, the term of this patent is extended or adjusted under 35 U.S.C. 154(b) by 160 days.

(21) Appl. No.: 14/606,604

(22) Filed: Jan. 27, 2015

(65) Prior Publication Data

US 2015/0215335 A1 Jul. 30, 2015

Related U.S. Application Data

(60) Provisional application No. 61/931,772, filed on Jan. 27, 2014.

(51) Int. Cl.
*H04L 29/06* (2006.01)
*G06F 21/55* (2013.01)
*G06F 21/52* (2013.01)

(52) U.S. Cl.
CPC .......... *H04L 63/1441* (2013.01); *G06F 21/52* (2013.01); *G06F 21/554* (2013.01); *H04L 63/1408* (2013.01)

(58) Field of Classification Search
CPC . H04L 63/1408; H04L 63/1441; G06F 21/52; G06F 21/554
See application file for complete search history.

(56) References Cited

U.S. PATENT DOCUMENTS

| 7,313,821 B1* | 12/2007 | Steiner | G06F 21/554 |
| | | | 714/E11.207 |
| 8,037,526 B1* | 10/2011 | Satish | G06F 21/52 |
| | | | 711/6 |

(Continued)

OTHER PUBLICATIONS

International Search Report and Written Opinion for International Application No. PCT/US15/13111, dated Apr. 17, 2015, 15 pages.

*Primary Examiner* — Joseph P Hirl
*Assistant Examiner* — Thomas A Gyorfi
(74) *Attorney, Agent, or Firm* — Merchant & Gould P.C.

(57) ABSTRACT

In non-limiting examples, anti-exploit systems and methods described herein monitor a memory space of a process for execution of functions. Stack walk processing is executed upon invocation of one of the functions in the monitored memory space. During execution of the stack walk processing, at least one memory check is performed to detect suspicious behavior. An alert of suspicious behavior is triggered when the performing of the memory check detects at least one of: code execution attempted from non-executable memory, identification of an invalid base pointer, identification of an invalid stack return address, attempted execution of a return-oriented programming technique, the base pointer is outside a current thread stack, and a return address is detected as being inside a virtual memory area. If an alert of suspicious behavior is triggered, execution of a payload is prevented for the invoked function.

18 Claims, 4 Drawing Sheets

(56) References Cited

U.S. PATENT DOCUMENTS

| | | |
|---|---|---|
| 8,510,596 B1 | 8/2013 | Gupta et al. |
| 2005/0108562 A1 | 5/2005 | Khazan et al. |
| 2006/0230388 A1* | 10/2006 | Hatlelid .................. G06F 21/52 717/127 |
| 2007/0016914 A1* | 1/2007 | Yeap ..................... G06F 21/554 719/328 |
| 2007/0089088 A1* | 4/2007 | Borde .................... G06F 21/52 717/106 |
| 2009/0049550 A1* | 2/2009 | Shevchenko ........... G06F 21/56 726/23 |
| 2011/0145924 A1 | 6/2011 | Kolsek et al. |
| 2011/0289586 A1* | 11/2011 | Kc ....................... G06F 21/566 726/24 |
| 2012/0255013 A1 | 10/2012 | Sallam |
| 2012/0255018 A1 | 10/2012 | Sallam |
| 2013/0198527 A1* | 8/2013 | Lu ......................... G06F 9/445 713/189 |

* cited by examiner

300

DETECTING AND PREVENTING EXECUTION OF SOFTWARE EXPLOITS

PRIORITY

This application claims the benefit of U.S. Provisional Application No. 61/931,772, filed on Jan. 27, 2014, which is hereby incorporated by reference in its entirety.

BACKGROUND

An exploit is a piece of code, software, data, or a sequence of commands that takes advantage of a bug, glitch or vulnerability in order to cause unintended or unanticipated behavior to occur on computer software, hardware, or any other electronic component. Exploits are usually intended for malicious purposes and pose threats that can compromise a computing system or device, for example, by hijacking normal code flow execution of a process towards a zone of memory where exploit code currently stands. For instance, exploit code may launch a new process or manipulate an existing process to perform malicious execution. Prevention of software exploits from executing code is a paramount security concern for system users and administrators. It is with respect to this general environment that aspects of the present technology disclosed herein have been contemplated.

SUMMARY

Aspects of the present disclosure relate to anti-exploit examples. In non-limiting examples, anti-exploit systems and methods described herein monitor a memory space of a process for execution of functions. Stack walk processing is executed upon invocation of one of the functions in the monitored memory space. During execution of the stack walk processing, at least one memory check is performed to detect suspicious behavior. An alert of suspicious behavior is triggered when the performing of the memory check detects at least one of: code execution attempted from non-executable memory, identification of an invalid base pointer, identification of an invalid stack return address, attempted execution of a return-oriented programming technique, the base pointer is outside a current thread stack, and a return address is detected as being inside a virtual memory area. If an alert of suspicious behavior is triggered, execution of a payload is prevented for the invoked function.

In other non-limiting examples, the anti-exploit examples described herein monitor a memory space of a process for execution of functions. Stack walk processing is executed upon invocation of one of the functions in the monitored memory space. During execution of the stack walk processing, at least one memory check is performed to detect suspicious behavior. An alert of suspicious behavior is triggered when the performing of the memory check detects at least one of: code execution attempted from non-executable memory, identification of an invalid base pointer, identification of an invalid stack return address, attempted execution of a return-oriented programming technique, the base pointer is outside a current thread stack, a return address is detected as being inside a virtual memory area, and a low level user mode function is attempted to be executed in a cache, where the cache is evaluated for identification of an address of the invoked function. One of skill in the art will appreciate that the embodiments disclosed herein can be employed to detect other types of suspicious behavior. If an alert of suspicious behavior is triggered, action is taken to prevent execution of a payload for the invoked function.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures. As a note, the same number represents the same element or same type of element in all drawings.

DETAILED DESCRIPTION

Non-limiting examples of the present disclosure provide anti-exploit examples that prevent exploit code from being executed. Examples describe monitoring of memory process control flow in order to detect potential suspicious behavior and performing at least one check to evaluate how memory is being allocated before setting/marking an area of memory space as suspicious. By analyzing characteristics of memory space where a function is called from, the anti-exploit examples are able to effectively and accurately determine whether an exploit is attempting to execute its own code or if intended execution of application code is normal system behavior.

A number of technical advantages are achieved based on the present disclosure including but not limited to: enhanced security protection, improved detection of potential security exploits, reduction in error rate in identification and marking of suspicious behavior (e.g., false positives), and improved usability and interaction with users who are not required to continuously monitor for security exploits, among other examples.

Figure 1:
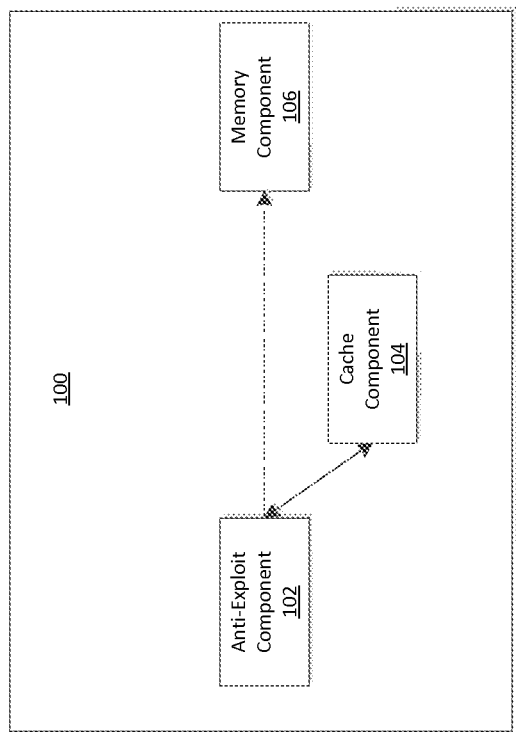
FIG. 1 illustrates an exemplary system 100 showing interaction of components for implementation of exemplary anti-exploit examples described herein.

FIG. 1 illustrates an exemplary system 100 showing interaction of components for implementation of exemplary anti-exploit technology described herein. Exemplary system 100 presented is a combination of interdependent components that interact to form an integrated whole for execution of exploit detection and prevention operations. Components of the systems may be hardware components or software implemented on and/or executed by hardware components of the systems. In examples, system 100 may include any of hardware components (e.g., used to execute/run operating system (OS)), software components (e.g., applications, application programming interfaces, modules, virtual machines, runtime libraries, etc.) running on hardware. In one example, an exemplary system 100 may provide an environment for software components to run, obey constraints set for operating, and makes use of resources or facilities of the system 100, where components may be software (e.g., application, program, module, etc.) running on one or more processing devices. For instance, an anti-exploit mechanism (e.g., application, instructions, modules, etc.) may be run on a processing device such as a computer, mobile device (e.g., smartphone/phone, tablet) and any other electronic devices, where components of the system may be executed on the processing device. In other examples, the components of systems disclosed herein may be spread across multiple devices. For instance, input may be entered on a client device (e.g., mobile phone) and information may be processed or accessed from other devices in a network such as one or more server devices used to implement an anti-exploit mechanism or protocol.

As one example, the system 100 comprises an anti-exploit component 102, a cache component 104, and a memory component 106, each having one or more additional components. The scale of systems such as system 100 may vary and include more or less components than those described in FIG. 1. In some examples, interfacing between components of the system 100 may occur remotely, for example where anti-exploit technology is implemented remotely to monitor and control process flow for detection of suspicious behavior (e.g., exploit) and prevention of execution of code of the suspicious behavior.

An anti-exploit component 102 implements anti-exploit examples described herein to detect suspicious behavior and prevent exploit code of software exploits from being executed. An exploit is a piece of code, software, data, or a sequence of commands that takes advantage of a bug, glitch or vulnerability in order to cause unintended or unanticipated behavior. Example types of exploits include malware such as computer viruses, worms, trojan horses, spyware and adware, among other examples. As an example, the anti-exploit examples described herein prevent exploit code of a process from executing another process or loading a module into the process memory. The anti-exploit examples implemented by the anti-exploit component 102 are able to be configured to detect and prevent software exploits that attempt to execute another process or load a module into process memory, for instance, a process where shellcode is able to be injected and executed.

An action of calling a system process (e.g., function of an application or application programming interface (API)) from a low level perspective, involves the presence of a particular set of assembly instruction, such as a CALL, inside the process memory. A low level operation or instruction provides minimal abstraction from a computer's instruction set architecture, for example either machine code or assembly language. The word "low" refers to the small or nonexistent amount of abstraction between the programming language and machine language. Low-level languages can be converted to machine code without using a compiler or interpreter, and the resulting code runs directly on the processor. Once the CALL instruction is reached, the code flow of the program starts to follow a chain of functions which will lead to the lowest level user mode function, before transitioning to Kernel Mode. In Kernel mode, the executing code has complete and unrestricted access to the underlying hardware. It can execute any CPU instruction and reference any memory address. Kernel mode is generally reserved for the lowest-level, most trusted functions of the operating system. In user mode, the executing code has no ability to directly access hardware or reference memory. Code running in user mode must delegate to system APIs to access hardware or memory. Most of the code running on a processing device such as a computer will execute in user mode. Thus, an instruction from user mode involves system call instructions (e.g., triggering operating system dependent software interrupt or control transfer instructions such as a sysenter assembly instruction) to execute a kernel function.

Generally, a non-malicious call starts from a range of pages in a zone of memory containing application or system module execution code. This zone, of memory contains data (e.g., pages) used to store a module (e.g., executable file (.exe) or dynamic-link library (DLL)) assembly code. The zone of memory may share physical storage with other processes. As an example, the zone of memory may be marked as MEM_IMAGE. The anti-exploit described herein detect functions called from user mode, for example, that attempt to allocate new pages of memory, reallocate system memory or modify the type of a memory page. In examples, an exploit may be initiated from another zone of memory (e.g., outside of the MEM_IMAGE zone/region such as a non MEM_IMAGE region). In another example, an exploit may attempt alter instruction sequences within a system memory region such as MEM_IMAGE, for example, by return-oriented programming (ROP). The anti-exploit component 102 monitors for, detects, and takes action to prevent such suspicious behavior.

In order to reach a goal of starting a new process, an exploit has to execute a complete execution stack starting from the shellcode and running down through to a lowest level user function (e.g., instruction that includes machine or assembly instruction). Shellcode is a small piece of code used as the payload in the exploitation of a software vulnerability. An exploit will commonly inject shellcode into the target process before or at the same time as it exploits a vulnerability to gain control over a program counter. The program counter is adjusted to point to the shellcode, after which the shellcode (including the malicious payload) is executed.

The anti-exploit component 102 executes a function hooking technique to hook to the lowest level user mode function and intercept system routines of a called API. A hooking technique covers a range of techniques used to alter or augment the behavior of an operating system, of applications, or of other software components by intercepting function calls or messages or events passed between software components. A hook is code that handles such intercepted function calls, events or messages.

The anti-exploit component 102 loads a component such as a custom module into the memory space of each monitored process. This component intercepts monitored operating system applications or APIs and evaluates a record (e.g., stack frame) of a call stack. A stack frame is a frame of data that gets pushed onto a stack that stores information about the active subroutines of a computer program. As an example, a stack frame may represent a function call and its argument data.

When unidentified code tries to allocate/mark a new executable page of memory which is not related to any valid process module, the custom component monitors these newly allocated memory regions and prevents any attempted execution of monitored functions. Functions monitored comprise processes that attempt execution of another process or loading of a module into a process memory, for example, function such as NtCreateProcess, NtCreateProcessEX, NtCreateUserProcess, LdrLoadDll, among other examples monitored functions. The present application is not limited to functions of a specific operating system. One skilled in the art will appreciate that the embodiments disclosed herein can be employed to cover functions that attempt execution of another process or loading of a module into a process memory, implementable by/in other operating systems. The anti-exploit examples of the anti-exploit component 102 are configurable to be programmed to monitor any type of function of an application/API. A list of monitored functions may be maintained by the anti-exploit component 102. Examples of functions monitored by the anti-exploit technology include but are not limited to: NtAllocateVirtualMemory, NtProtectVirtualMemory, NtCreateProcess, NtCreateProcessEX, NtCreateUserProcess, LdrLoadDll, among other examples. Again, one skilled in the art will appreciate that the embodiments disclosed herein can be employed to monitor any functions that attempt execution of another process or loading of a module into a process memory, implementable by/in other operating systems. The list of monitored functions may change perpetually and can be updated (e.g., by an administrator or software update) at any time to improve the robustness of the functions monitored and improve security against software exploits. The function hooking technique of the anti-exploit component 102 intercepts the system routines of the called process.

A hooked function (including but not limited to NtCreateProcess, NtCreateProcessEX, NtCreateUserProcess, LdrLoadDll) is monitored/evaluated through execution of stack walk processing. The anti-exploit component 102 executes stack walk processing that walks up a call stack for the process (function) until an address of the first function of a called function is reached. As an example, for stack walk processing, when one of the functions listed before is invoked, the first step is to get the value of the call frame pointer for being able to walk the call stack frame. The call frame pointer contains the address of the stack frame for the called function. In the examples disclosed herein, the anti-exploit technology may go back through the stack_entry chain until the initial caller's stack frame is reached (e.g., back-walk the stack frame starting from the lowest level user mode function to an address where the call sequence started for the hooked function). Once reached, an address from where the call sequence has started for the hooked function is located and characteristics of that particular memory region are retrieved and analyzed (e.g., evaluating state information of the particular memory region). In the stack walk processing, an address of a base pointer of the stack and an address of a stack pointer are identified for a stack frame associated with the called function. As an example of a base pointer, a precFp may be identified. A precFp is a pointer to the previous STACK_ENTRY structure of the called function. The retAddr is the address where the control flow must continue after the called function has completed. Each time a CALL is executed, a new stack frame is created and the return address is set with the value of the instruction following CALL opcode (e.g., portion of machine language instruction that specifies an operation to be performed).

During the stack walk processing of the stack frame, a first call address of a call sequence is one that is present in the last valid stack entry. A list of conditions may be evaluated against each stack entry found during the stack walk. As examples, a stack frame of a called function may be required to satisfy conditions such as:
   both, precFp and retAddr, must be valid accessible addresses (verified via system APIs, for example VirtualQuery( ) and TestVirtualMemoryAccess( )); and
   if these addresses are valid, then the previous 10 bytes before the retAddr address are parsed, searching for a CALL assembly instruction of the hooked function. Every time a CALL instruction is executed, a new stack frame is created and the return address is set with the value of the address of the instruction following the CALL op-code.

In a case where conditions, such as the above identified conditions, are satisfied, the stack walk processing may proceed with evaluating a memory region associated with a called function. For example, stack walk processing may include performing one or more memory checks from the lowest level user function of the hooked function down through the address of the originating caller function (e.g., the hooked function). Once the address is located from where the call sequence has started, characteristics of that particular memory region are retrieved and analyzed. In analyzing the characteristics of the memory region, the memory region data (e.g., memory pages) maintained in a cache by the anti-exploit examples disclosed herein are evaluated during performance of a memory check. The stack walk processing executed by the anti-exploit component 102 performs a memory check or checks on a frame of call stack pertaining to the called process (including one or more functions) attempting to detect and identify suspicious behavior that may pertain to a software exploit. Examples of memory checks performed are provided in a later description of FIG. 2. Unlike other exploit prevention technologies that try to prevent that an exploit starts its own shellcode, the anti-exploit examples implemented by the anti-exploit component 102 prevent that the shellcode performs an ultimate execution of a malicious payload, whether the malicious payload is loading another module or executing another process.

The anti-exploit component 102 interfaces with a cache component 104 as shown in system 100 of FIG. 1. The cache component 104 is a structure (hardware or software) that stores data related to a memory region for a monitored process. Memory used for a cache is allocated by the anti-exploit technology, for example by the anti-exploit component 102. The cache component 104 maintains a cache for a monitored process. A cache is a specific memory region allocated in each monitored process where information about monitored memory pages is tracked. In an example, the cache component 104 interface with the anti-exploit component 102 during hooking of a monitored function to store state information about pages of memory associated with the called function when the permission is changed, for example, changing the permission to "execute." State information tracked by the cache component 104 comprises information about the allocation of memory pages for a monitored process and the initial permissions and type of the memory pages as well as any later changes of permissions for each memory page. In at least one variation of system 100, the cache component 104 may be included in the anti-exploit component 102. While FIG. 1 illustrates the cache component 104 as a separate component from the anti-exploit component 102 for ease of explanation, the anti-exploit technology implemented may be a collection of operations that include the ability to cache data.

During execution of the stack walk processing, the cache component 104 tracks and evaluates the state information about pages of memory relate to a monitored process. The hooked function is triggered and a back-walk of the stack frame is initiated, where the back-walk walks up the call stack from the lowest level user mode function (hooked function) until the first function of the chain is reached. The anti-exploit component 102 interfaces with the cache component 104 to evaluate the tracked memory information for a monitored process, for example while a memory check is being performed during the stack walk processing. The tracked memory information in the cache component 104 is evaluated before the anti-exploit technology allows code of the process to access memory space (e.g., system memory) of the memory component 106. Memory checks performed pertaining to tracked data in the cache may trigger an alert of suspicious behavior, for example, where the anti-exploit component 102 identifies what it believes to be shellcode and prevents execution of a malicious payload of the shellcode.

The cache component 104 is implementable as a linked list of nodes. Each node entry stores specific data (including the nature of the potential attack) about a memory region that is monitored. A new node may be added any time system service routines are invoked related to a memory space. Examples of system services routines associated with memory include functions similar to NtAllocateVirtualMemory or NtProtectVirtualMemory.

As an example, a function that may be monitored is a function associated with creation or allocation of at least one region in a memory space (e.g., virtual memory space). For instance, NtAllocateVirtualMemory is a routine invoked in order to reserve, commit, or both, a region of pages within the user-mode virtual address space of the process. As an example, a new node is created if the memory is allocated as PAGE_EXECUTE_READWRITE in a non MEM_IMAGE region or in case a suspicious behavior matching logic rules was found during the stack walk.

As another example, a function associated with protection or change to protection in at least one region of a memory space (e.g., virtual memory space) may be monitored. For instance, NtProtectVirtualMemory is a routine invoked in order to change the protection on a region of committed pages of the virtual address space of the process. As an example, a new node is created if the memory protection of a non MEM_IMAGE region is changed to PAGE_EXECUTE_READWRITE and the prior protection/permission assigned to the page was non-executable or in case a suspicious behavior matching logic rules was found during the stack walk.

When a memory check performed during the stack walk processing does not trigger an alert of suspicious behavior, the anti-exploit component 102 enables a complete called function to access the a system kernel via the memory component 106. The memory component 106 is one or more structures (hardware or software) of system memory. In a case where a memory check performed during the stack walk processing triggers an alert of suspicious behavior (e.g., a potential security exploit), the anti-exploit component 102 prevents the execution of the payload of the called function, thus preventing access to the memory component 106.

Figure 2:
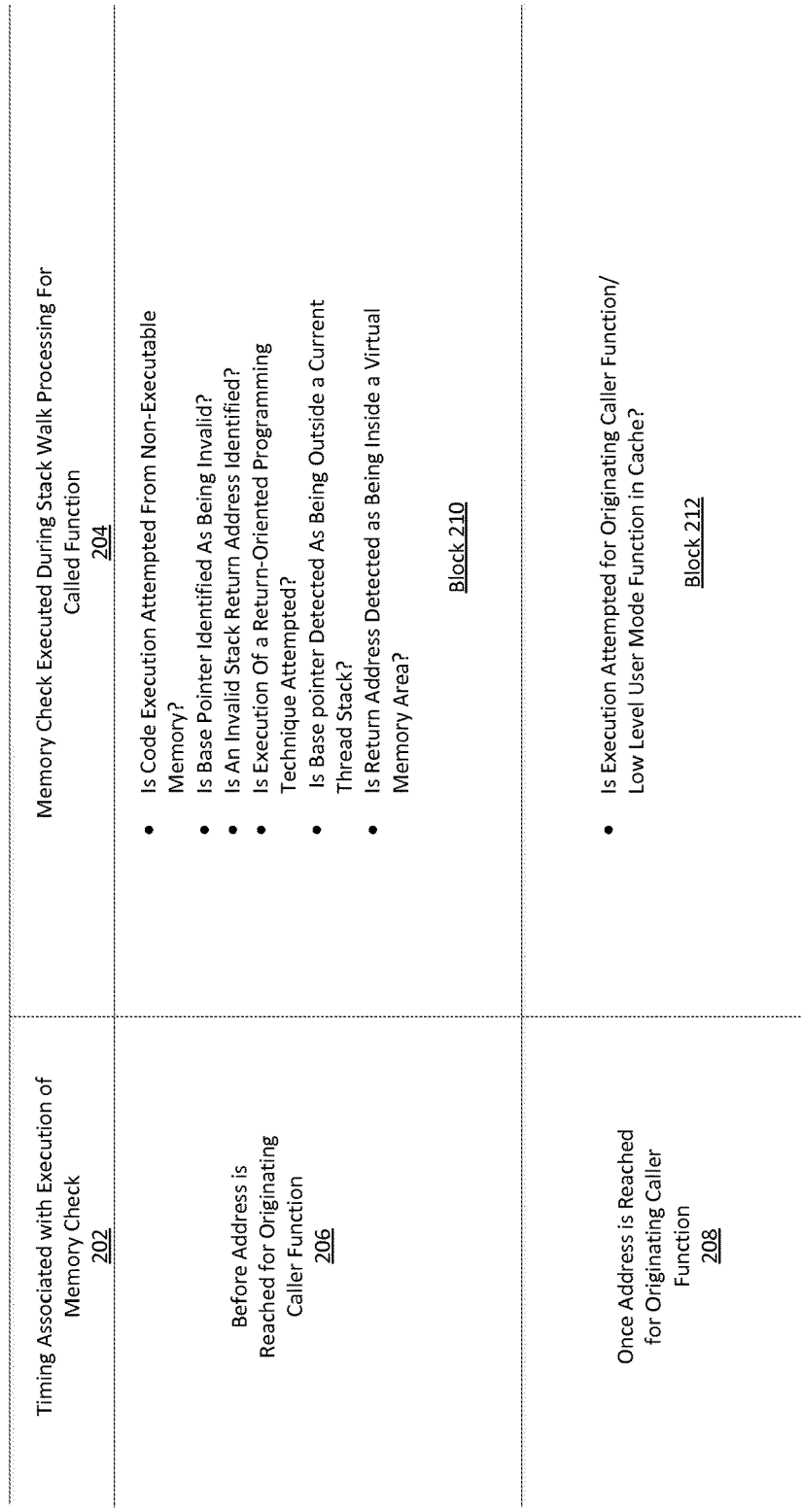
FIG. 2 illustrates an exemplary chart 200 of one or more memory checks performed by the anti-exploit examples described herein.

FIG. 2 illustrates an exemplary chart 200 of memory checks performed by the anti-exploit examples described herein. Chart 200 identifies exemplary memory checks performed during stack walk processing. As referenced above, a stack-walk is executed in reverse order from a system call-up to an initiating caller address, which could be shellcode. By performing the memory checks during the stack walk processing (e.g., back-walk of the stack frame), shellcode is able to be prevented from performing execution of a malicious payload.

In chart 200, column 202 identifies a timing associated with performance of exemplary memory checks and comprises rows 206 and 208. Row 206 identifies a timing of performing memory checks before an address is reached for an originating caller function. Memory checks performed during the stack walk processing at a timing before an address is reached for an originating caller function (row 206), include the memory checks identified in block 210. Row 208 identifies a timing of performing memory checks once an address is reached for an originating caller function. Memory checks performed during the stack walk processing once an address is reached for an originating caller function (row 208), include the memory checks identified in block 212.

Memory checks (identified in block 210) are made continuously during the stack walk processing until the address of an originating caller function (e.g., hooked function) is reached. At least one additional memory check (block 212) is made if the address of the originating caller function is reached. An example of an originating caller function is the hooked and monitored function that is associated with the stack frame being evaluated.

Memory checks (column 204) performed at a timing (column 202) before an address for an originating caller function is reached (as indicated in row 206) are shown in block 210. Block 210 includes, but is not limited to, the following memory checks:

Is code execution attempted from non-executable memory;
Is a base pointer of a stack frame identified as being invalid;
Is invalid stack return address identified for a stack frame;
Is attempted execution of a return-oriented programming technique detected;
Is the base pointer of a stack frame detected as being outside a current thread stack, and
Is a return address detected as being inside a virtual memory area.

One of skill in the art will appreciate that a subset of these checks or other checks not listed may be performed without departing from the spirit of this disclosure.

For detection of code execution from non-executable memory as shown in block 210, the systems and methods disclosed herein determine whether a process is being loaded from a memory address of the memory space that is marked as non-executable or if a return address found in the stack walk chain falls in a non-executable memory. As an example, the anti-exploit examples may look for flags indicating that a process is associated with non-executable memory of the memory space. For instance, flags indicating functions similar to PAGE_EXECUTE, PAGE_EXECUTE_READ, PAGE_EXECUTE_READWRITE or PAGE_EXECUTE_WRITECOPY, can trigger an alert of suspicious behavior.

For detection of an invalid base pointer (e.g., base stack pointer) as shown in block 210, anti-exploit systems and methods evaluate whether a memory address associated with a base pointer of a stack frame fails into a memory address that is not accessible or not allocated. For example, if a base pointer for a current stack frame (e.g., current EBP) during the stack walk falls into a memory address that is not accessible or not allocated, an alert of suspicious behavior is triggered. In a case where an invalid base pointer is found inside a virtual memory management API, the address will be saved in the local cache and further evaluated using an additional memory check such as whether execution of an originating caller function is attempted in the cache once the address for the originating caller function is reached in the stack walk processing. If instead the behavior is found from an API process such as or similar to loadImage/createprocess, an alert of suspicious behavior will be triggered immediately.

An alert of suspicious behavior is triggered when an invalid stack return address is detected as shown in block 210. Anti-exploit systems and methods evaluate if the current stack pointer during the stack walk falls into a memory address that is not accessible. If so, an alert is triggered. In the case an invalid stack return address is found inside a virtual memory management API, the address will be saved in the local cache. If instead the behavior is found from an API process such as or similar to loadImage/createprocess, an alert of suspicious behavior will be triggered immediately.

If the current return address during the stack walk is a ROP gadget as shown in block 210, anti-exploit systems and methods trigger an alert of suspicious behavior. A ROP gadget is a security exploit that executes carefully chosen machine instruction sequences. Some exploit scenarios describe previously relate to injecting code into an API and getting the injected code executed. In evaluating a ROP gadget, this memory check evaluates whether API code (without injecting code) is to be executed out of sequence, for example, where a ROP gadget may force API code to jump to another place of code in an order intended to exploit the API code. In a case where a ROP gadget is found inside a virtual memory management API, the address will be saved in the local cache and further evaluated using an additional memory check such as whether execution of an originating caller function is attempted in the cache once the address for the originating caller function is reached in the stack walk processing. If instead the behavior is found from an API process such as or similar to loadImage/createprocess, an alert of suspicious behavior will be triggered immediately.

In some cases, a base pointer may be valid and accessible outside a current thread stack for a stack frame being evaluated as shown in block 210. In examples, when a base pointer is outside a current thread stack an alert for suspicious behavior is triggered. In the case where a base pointer is outside a current thread stack but inside a virtual memory management API, the address will be saved in the local cache and further evaluated using an additional memory check such as determining whether execution of an originating caller function is attempted in the cache once the address for the originating caller function is reached in the stack walk processing. If instead the behavior is found from an API process such as or similar to loadImage/createprocess, an alert of suspicious behavior will be triggered immediately.

Another memory check shown in block 210 is performed to evaluate whether a return address is detected as being inside a virtual memory area that is going to be marked or allocated as executable. If the current return address during the stack walk chain falls into the memory area which is going to be allocated/marked as executable an alert will be triggered immediately.

Once the address of the originating caller function is reached in the stack walk processing (as identified in row 208), an additional check is performed to evaluate the address of the invoked/called function found in a cache entry is executable as shown in block 212. During the stack walk processing, an address of an invoked function (e.g., originating caller function is identified). If an address of an invoked function is found in a cache entry, then the call is suspicious and an alert is triggered. Each entry present in the cache structure represents a part of memory that has been recently allocated with as executable (e.g., by a flag such as or similar to "EXECUTE"), and is thus a potential piece of memory that could host malicious code. If the anti-exploit technology intercepts a call to API functions such as or similar to NtCreateProcess/NtCreateProcessEx/LdrLoadDll from one of such entries, it automatically marks this behavior as suspicious and potentially malicious.

Figure 3:
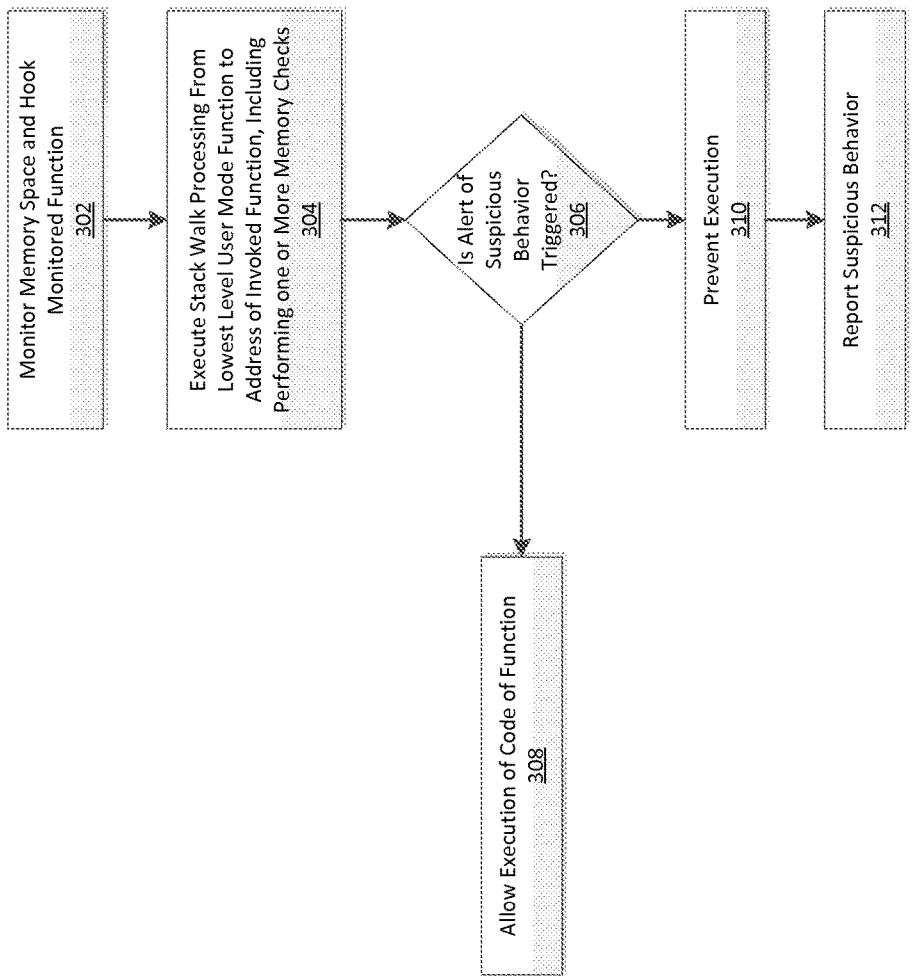
FIG. 3 illustrates an exemplary method 300 for implementation of anti-exploit systems and methods described herein.

FIG. 3 illustrates an exemplary method 300 for implementation of anti-exploit systems and methods described herein. As an example, method 300 may be executed by an exemplary system such as system 100 of FIG. 1. In other examples, method 300 may be executed on a device comprising at least one processor configured to store and execute operations, programs or instructions. However, method 300 is not limited to such examples. In other examples, method 300 may be performed an application or service executing the anti-exploit technology.

Method 300 begins at operation 302 where a memory space of a process is monitored for execution of at least one of a plurality of functions. Examples of functions monitored are described as part of the description of FIG. 1. As an example, operation 302 monitors functions associated with memory management in the memory space by a user mode function (e.g., a call initiated from a user mode). In at least one example, operation 302 further comprises applying, upon detecting a function call of one of the plurality of functions in the monitored memory space, a function hooking technique to hook a lowest level user mode function of a called process (e.g., API). In examples, the monitoring may further comprise detecting an attempt by unidentifiable code to allocate a new executable page of memory and monitoring the allocated new executable page of memory.

Flow proceeds to operation 304 where stack walk processing is performed on a hooked and/or monitored function. When one of the plurality of functions is invoked, the stack walk processing is executed for a stack frame associated with an invoked function (e.g., originating caller function). Execution of the stack walk processing is described in further detail in the description of FIG. 1 and is a process that walks a stack frame for a hooked functioned from a lowest level user mode function to an address of the invoked function/originating caller function. Operation 304 further comprises performing one or more memory checks during the stack walk processing. Examples of memory checks that are performed are described in detail in the description of FIG. 2. In one example, an originating address associated with the invoked function is identified.

Flow proceeds to decision operation 306 where a determination is made as to whether an alert of suspicious behavior is triggered based on execution of the one or more memory checks performed during the stack walk processing. For example, chart 200 of FIG. 2 identifies timing associated with performance of specific memory checks. In some examples, an alert of suspicious behavior is triggered before an address of an originating caller function is reached in the stack walk processing. In other examples, each memory check is performed before an alert is triggered. If decision operation 306 determines that no alert of suspicious behavior is triggered, then flow proceeds to operation 308 where execution of code (e.g., a payload) associated with an invoked function is allowed. If decision operation 306 determines that an alert of suspicious behavior is triggered, the flow proceeds to operation 310 where execution of code associated with an invoked function is prevented. As an example, operation 310 takes action to prevent execution of a payload for the invoked function. In some example, method 300 comprises an operation of reporting suspicious behavior (operation 312). Data collected from tracking identification of potentially malicious behavior and detection of malicious behavior (as well as successful cases where execution of malicious behavior was prevented) may be useful in tracking security exploits, statistical analysis of the anti-exploit technology, and augmenting anti-exploit technology to improve over time.

Figure 4:
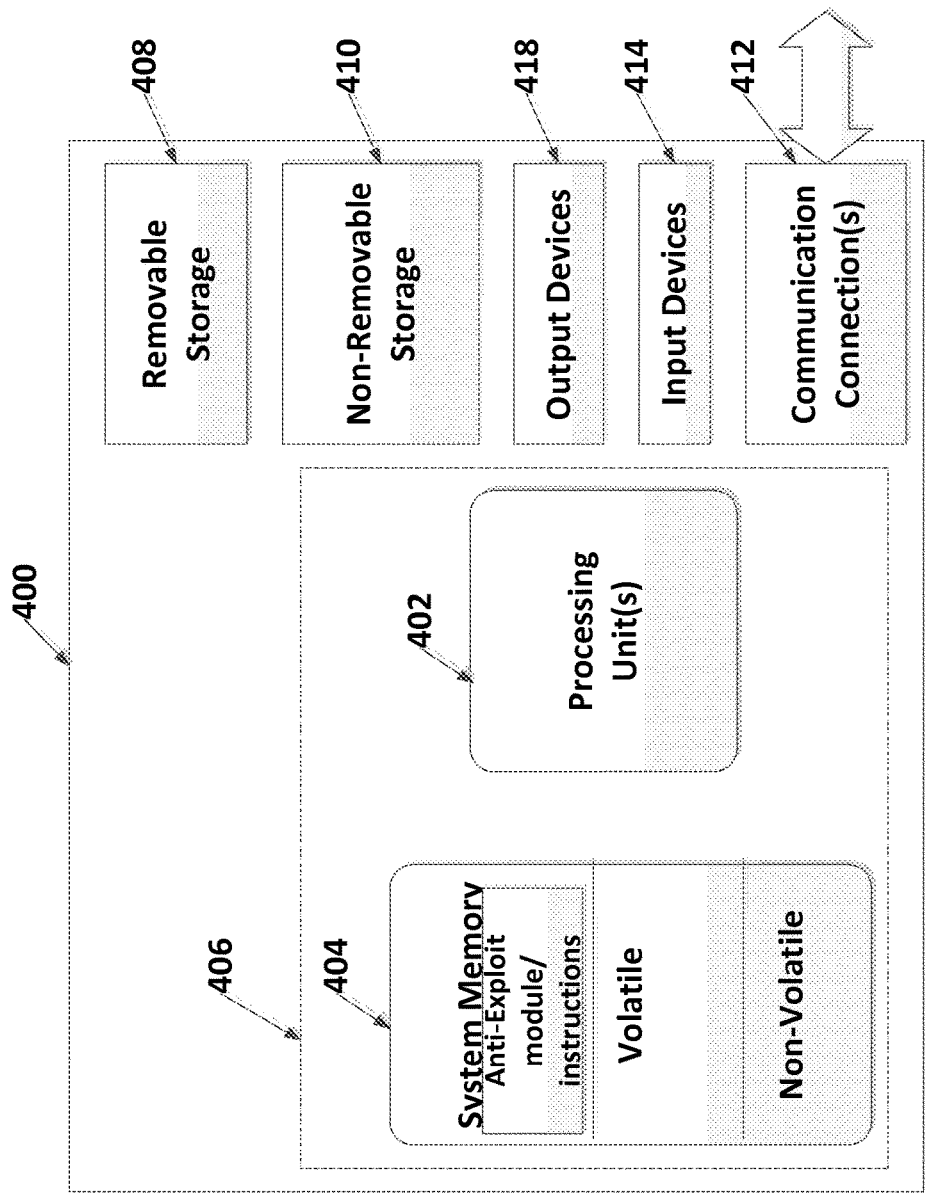
FIG. 4 illustrates one example of a suitable operating environment 400 in which one or more of the present examples may be implemented.

FIG. 4 and the additional discussion in the present specification are intended to provide a brief general description of a suitable computing environment in which the present invention and/or portions thereof may be implemented. Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, anti-exploit module(s), e.g., Anti-exploit applications, APIs, programs etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 4 by dashed line 506. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

As stated above, a number of program modules and data files may be stored in the system memory 404. While executing on the processing unit 402, program modules 408 (e.g., applications, Input/Output (I/O) management, and other utilities) may perform processes including, but not limited to, one or more of the stages of the operational methods described herein such as method 300 illustrated in FIG. 3, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A computer-implemented method comprising:
   monitoring a memory space of a process for execution of at least one monitored function of a plurality of functions, wherein monitoring the memory space comprises loading a component for evaluating the at least one monitored function in the memory space;
   invoking one of the plurality of functions as a result of receiving a call from an application programming instance;
   executing stack walk processing upon the invocation of one of the plurality of functions in the monitored memory space; and
   performing, during the executing of the stack walk processing before an address of an originating caller function is reached, a memory check for a plurality of stack entries identified during the stack walk processing to detect suspicious behavior, wherein an alert of suspicious behavior is triggered when the performing of the memory check detects at least one of the following:
   code execution is attempted from non-executable memory,
   a base pointer is identified as being invalid,
   an invalid stack return address is identified,
   attempted execution of a return-oriented programming technique is detected,
   the base pointer is detected as being outside a current thread stack, and
   a return address is detected as being inside a virtual memory area,
   wherein when an alert of suspicious behavior is triggered, preventing execution of a payload for the invoked function from operating.

2. The method according to claim 1, further comprising:
   identifying an address associated with the invoked function; and
   when the address of the invoked function address is found in a cache, preventing execution of a payload for the invoked function.

3. The method according to claim 1, wherein executing of the stack walk processing further comprises walking a stack frame associated with the invoked function from a low level user mode function to the originating address of the invoked function.

4. The method according to claim 1, wherein the monitoring further comprises monitoring functions associated with memory management in the memory space by a user mode function.

5. The method according to claim 1, wherein the monitoring further comprises applying, upon detecting a function call of one of the plurality of functions in the monitored memory space, a hooking technique to hook a lowest level user mode function of the invoked function, wherein the executing of the stack walk processing executes a reverse stack walk from the lowest level user mode function of the invoked function.

6. The method according to claim 1, wherein the plurality of functions comprises an NtAllocateVirtualMemory function, an NtProtectVirtualMemory function, an NtCreateProcess function, an NtCreateProcessEX function, an NtCreateUserIProcess function, and an LdrLoadDll function.

7. The method according to claim 5, wherein performing the memory check comprises evaluating state information associated with a cache entry for the hooked function.

8. The method according to claim 7, wherein when an address of the invoked function is found in a cache, preventing execution of a payload for the invoked function.

9. A system comprising:
   at least one memory; and
   at least one processor connected with the memory configured to perform operation of:
   monitoring a memory space of a process for execution of at least one monitored function of a plurality of functions, wherein monitoring the memory space comprises loading a component for evaluating the at least one monitored function in the memory space;
   invoking one of the plurality of functions as a result of receiving a call from an application programming instance;
   executing stack walk processing upon the invocation of one of the plurality of functions in the monitored memory space; and
   performing, during the executing of the stack walk processing before an address of an originating caller function is reached, a memory check for a plurality of stack entries identified during the stack walk processing to detect suspicious behavior, wherein an alert of suspicious behavior is triggered when the performing of the memory check detects at least one of the following:
   code execution is attempted from non-executable memory,
   a base pointer is identified as being invalid,
   an invalid stack return address is identified,
   attempted execution of a return-oriented programming technique is detected,
   the base pointer is detected as being outside a current thread stack, and
   a return address is detected as being inside a virtual memory area,
   wherein when an alert of suspicious behavior is triggered, the method further comprising preventing execution of a payload for the invoked function.

10. The system according to claim 9, further comprising identifying an address associated with the invoked function; and when the address of the invoked function is found in a cache, and wherein the processor further executing an operation of preventing execution of a payload for the invoked function.

11. The system according to claim 9, wherein the executing of the stack walk processing further comprises walking a stack frame associated with the invoked function from a low level user mode function to the originating address of the invoked function.

12. The system according to claim 9, wherein the monitoring further comprises monitoring functions associated with memory management in the memory space by a user mode function.

13. The system according to claim 9, wherein the monitoring further comprises applying, upon detecting a function call of one of the plurality of functions in the monitored memory space, a hooking technique to hook a lowest level user mode function of the invoked function, and wherein the executing of the stack walk processing executes a reverse stack walk from the lowest level user mode function of the invoked function.

14. The system according to claim 9, wherein the plurality of functions comprises an NtAllocateVirtualMemory function, an NtProtectVirtualMemory function, an NtCreateProcess function, an NtCreateProcessEX function, an NtCreateUserIProcess function, and an LdrLoadDll function.

15. The system according to claim 13, wherein performing of the memory check comprises evaluating state information associated with a cache entry for the hooked function.

16. The system according to claim 15, wherein when an address of the invoked function is found in a cache, and wherein the processor further executing an operation of preventing execution of a payload for the invoked function.

17. A computer-readable storage device containing instructions, that when executed on at least one processor, causing the processor to execute a process comprising:
monitoring a memory space of a process for execution of at least one monitored function of a plurality of functions, wherein monitoring the memory space comprises loading a component for evaluating the at least one monitored function in the memory space;
invoking one of the plurality of functions as a result of receiving a call from an application programming instance;
executing stack walk processing upon the invocation of one of the plurality of functions in the monitored memory space; and
performing, during the executing of the stack walk processing before an address of an originating caller function is reached, a memory check for a plurality of stack entries identified during the stack walk processing to detect suspicious behavior, wherein an alert of suspicious behavior is triggered when the performing of the memory check detects at least one of the following:
code execution is attempted from non-executable memory,
a base pointer is identified as being invalid,
an invalid stack return address is identified,
attempted execution of a return-oriented programming technique is detected,
the base pointer is detected as being outside a current thread stack,
a return address is detected as being inside a virtual memory area, and
a low level user mode function is attempted to be executed in a cache, wherein the cache is evaluated for an address of the invoked function, and
wherein when an alert of suspicious behavior is triggered, preventing execution of a payload for the invoked function.

18. The computer-readable storage device according to claim 17, wherein performing of the memory check to determine if code execution is attempted from non-executable memory, the base pointer is identified as being invalid, an invalid stack return address is identified, execution of a return-oriented programming technique is attempted, the base pointer is detected as being outside a current thread stack, and the return address is detected as being inside a virtual memory area, occurs before an address of the invoked function is reached, and
wherein the performing of the memory check to determine whether the low level user mode function is attempted to be executed in the cache occurs upon reaching the address of the invoked function in the execution of the stack walk processing.

* * * * *